(12) United States Patent
Kung

(10) Patent No.: US 8,955,825 B2
(45) Date of Patent: Feb. 17, 2015

(54) LEAKAGE PREVENTION DEVICE FOR A VALVE

(71) Applicant: Wan-Rong Kung, Kaohsiung (TW)

(72) Inventor: Wan-Rong Kung, Kaohsiung (TW)

( * ) Notice: Subject to any disclaimer, the term of this patent is extended or adjusted under 35 U.S.C. 154(b) by 194 days.

(21) Appl. No.: 13/846,862

(22) Filed: Mar. 18, 2013

(65) Prior Publication Data

US 2014/0261772 A1    Sep. 18, 2014

(51) Int. Cl.
*F16K 41/10*    (2006.01)
*F16K 27/04*    (2006.01)

(52) U.S. Cl.
CPC ..................... *F16K 27/04* (2013.01)
USPC ......... 251/214; 251/286; 251/326; 251/335.3

(58) Field of Classification Search
USPC .............. 251/214, 335.3, 285–286, 326–329; 137/377
See application file for complete search history.

(56) References Cited

U.S. PATENT DOCUMENTS

| | | | | |
|---|---|---|---|---|
| 2,880,620 | A * | 4/1959 | Bredtschneider | 251/335.3 |
| 3,315,700 | A * | 4/1967 | Greenwood | 251/335.3 |
| 3,826,465 | A * | 7/1974 | Whittaker et al. | 251/335.3 |
| 5,662,335 | A * | 9/1997 | Larsen | 251/335.3 |
| 6,202,984 | B1 * | 3/2001 | Fichtner et al. | 251/335.3 |
| 2012/0217429 | A1 * | 8/2012 | Cheng | 251/335.3 |

* cited by examiner

*Primary Examiner* — John Bastianelli
(74) *Attorney, Agent, or Firm* — Alan Kamrath; Kamrath IP Lawfirm, P.A.

(57) ABSTRACT

A valve includes a plug mounted to a lower end of a valve rod for opening or closing a fluid passage in the body. The valve rod extends through a cap and a stretchable jacket. The stretchable jacket includes first and second ends and a deformation section between the first and second ends. The first end of the stretchable jacket is fixed to the cap. The second end of the stretchable jacket is fixed to the valve rod. A stop is located at the deformation section, dividing the stretchable jacket into first and second stretchable sections. A pull rod is fixed to the valve rod or the cap and slideable relative to the stop. First and second positioning members are mounted on the pull rod to limit travel of the pull rod by contacting with the stop, avoiding over stretching and undesired compression of the first or second stretchable section.

10 Claims, 11 Drawing Sheets

LEAKAGE PREVENTION DEVICE FOR A VALVE

BACKGROUND OF THE INVENTION

The present invention relates to a leakage prevention device for a valve and, more particularly, to a leakage prevention device for preventing leakage at a portion of a valve receiving a valve rod.

A valve is generally used in pipes to control opening or closing of a fluid passage in the pipes conveying a fluid. When the components of the valve malfunction due to corrosion by the fluid in the pipes or due to aging, maintenance of the valve is required to avoid loss resulting from leakage of the fluid.

FIG. 1 shows a conventional valve 1 including a body 11 having an inlet 111 and an outlet 112 for connection with pipes conveying a fluid. A cover 12 is mounted to a top portion of the body 11 and has an axial hole 121. A valve rod 13 has a lower end extending through the axial hole 121 and connected to a plug 14. A hand wheel 15 is mounted to an upper end of the valve rod 13. When the hand wheel 15 is rotated, the valve rod 13 and the plug 14 move upward or downward to open or close the fluid passage between the inlet 111 and the outlet 112. A plurality of gaskets 16 is stacked in the axial hole 121 and between the valve rod 13 and the cover 12 and is sandwiched between upper and lower bushings 17. A pressing block 18 is mounted on top of the upper bushing 17 to press against the gaskets 16 via the upper bushing 17. The gaskets 16 seal the gap between the valve rod 13 and the inner periphery of the axial hole 121 of the cover 12, avoiding leakage of the fluid via the axial hole 121. The valve 1 further includes a leakage prevention device 10 including a housing 101 and a stretchable tube 102 in the housing 101. A lower end of the housing 101 is fixed to an upper end of the body 11. The lower end of the valve rod 13 extends through the stretchable tube 102. An upper end of the stretchable tube 102 is received in the housing 101. A lower end of the stretchable tube 102 is fixed to the valve rod 13 to move therewith. The stretchable tube 102 can be stretched in the longitudinal direction of the valve 1 and can restore its original shape after the stretching force vanishes. The stretchable tube 102 also isolates the valve rod 13 from the housing 101, further preventing leakage of the fluid via the axial hole 121.

However, the stretchable tube 102 is apt to break at the lower end and the middle portion thereof having large deformation. In an attempt to fix this problem, two stretchable tubes 102 are connected in series. However, large deformation still occurs at the lower end of the set of the stretchable tubes 102, leading to stress concentration and the risk of breakage.

BRIEF SUMMARY OF THE INVENTION

An objective of the present invention is to provide a leakage prevention device for effectively preventing leakage in a valve.

In an aspect, a valve includes a body having. The body further includes a top portion having a chamber in communication with the fluid passage. A cap is mounted to the top portion of the body and seals the chamber. The cap includes an axial hole aligned with the chamber in a longitudinal direction. A valve rod includes upper and lower ends spaced from each other in the longitudinal direction. The valve rod is received in the chamber of the body and the axial hole of the cap. A hand wheel is mounted to the upper end of the valve rod. A plug is mounted to the lower end of the valve rod. The hand wheel is rotatable to move the valve rod and the plug in the longitudinal direction between an open position and a closed position to open or close the fluid passage of the body. A stretchable jacket is stretchable in a stretching direction parallel to the longitudinal direction. The stretchable jacket includes first and second ends spaced from each other in the stretching direction and a deformation section between the first and second ends of the stretchable jacket. The stretchable jacket further includes a through-hole extending from the first end through the second end of the stretchable jacket and receiving the valve rod. The first end of the stretchable jacket is sealingly coupled a lower end of the through-hole of the cap. The second end of the stretchable jacket is fixed to the valve rod. A first limiting unit includes a pull rod and a stop. The stop is located at the deformation section of the stretchable jacket, dividing the stretchable jacket into a first stretchable section between the second end of the stretchable jacket and the stop and a second stretchable section between the stop and the first end of the stretchable jacket. The stop includes a through-hole extending in a direction parallel to the stretching direction. The pull rod includes first and second ends spaced from each other in the longitudinal direction. The second end of the pull rod is fixed in relation to the valve rod. The pull rod slideably extends through the through-hole of the stop. A first positioning member is mounted on the first end of the pull rod. A second positioning member is mounted on the pull rod and located between the stop and the second end of the pull rod. The stop is located between the first and second positioning members. The first and second positioning members limit travel of the pull rod in the longitudinal direction.

When the valve rod moves in the longitudinal direction to move the plug from the open position to the closed position, the stretchable jacket is stretched, and stretching of the first stretchable section in the longitudinal direction is stopped when the first positioning member comes in contact with the stop.

On the other hand, when the valve rod moves in the longitudinal direction to move the plug from the closed position to the open position, the first stretchable section restores its shape, and restoration of the first stretchable section is stopped when the second positioning member comes in contact with the stop.

In another aspect, a valve includes a body having a fluid passage. The body further includes a top portion having a chamber in communication with the fluid passage. A cap is mounted to the top portion of the body and seals the chamber. The cap includes an axial hole aligned with the chamber in a longitudinal direction. A valve rod includes upper and lower ends spaced from each other in the longitudinal direction. The valve rod is received in the chamber of the body and the axial hole of the cap. A hand wheel is mounted to the upper end of the valve rod. A plug is mounted to the lower end of the valve rod. The hand wheel is rotatable to move the valve rod and the plug in the longitudinal direction between an open position and a closed position to open or close the fluid passage of the body. A stretchable jacket is stretchable in a stretching direction parallel to the longitudinal direction. The stretchable jacket includes first and second ends spaced from each other in the stretching direction and a deformation section between the first and second ends of the stretchable jacket. The stretchable jacket further includes a through-hole extending from the first end through the second end of the stretchable jacket and receiving the valve rod. The first end of the stretchable jacket is sealingly coupled a lower end of the through-hole of the cap. The second end of the stretchable jacket is fixed to the valve rod. A limiting unit includes a pull rod and a stop. The stop is located at the deformation section of the stretchable jacket, dividing the stretchable jacket into a first stretchable section between the second end of the stretchable jacket and the stop and a second stretchable section between the stop and the first end of the stretchable jacket. The stop includes a through-hole extending in a direction parallel to the stretching direction. The pull rod includes first and second ends spaced from each other in the longitudinal direction. The first end of the pull rod is fixed to the cap. The pull rod slideably extends through the through-hole of the stop. The stop is movable relative to the pull rod in the longitudinal direction. A first positioning member is mounted on the second end of the pull rod. A second positioning member is mounted on the pull rod. The stop is located between the first and second positioning members. The first and second positioning members limit travel of the pull rod in the longitudinal direction.

When the valve rod moves in the longitudinal direction to move the plug from the open position to the closed position, the stretchable jacket is stretched, and stretching of the second stretchable section in the longitudinal direction is stopped when the stop comes in contact with the first positioning member.

On the other hand, when the valve rod moves in the longitudinal direction to move the plug from the closed position to the open position, the second stretchable section restores its shape, and restoration of the second stretchable section is stopped when the stop comes in contact with the second positioning member.

The present invention will become clearer in light of the following detailed description of illustrative embodiments of this invention described in connection with the drawings.

DESCRIPTION OF THE DRAWINGS

FIG. 11A shows an enlarged view of a circled portion in FIG. 11.

DETAILED DESCRIPTION OF THE INVENTION

Figure 1:
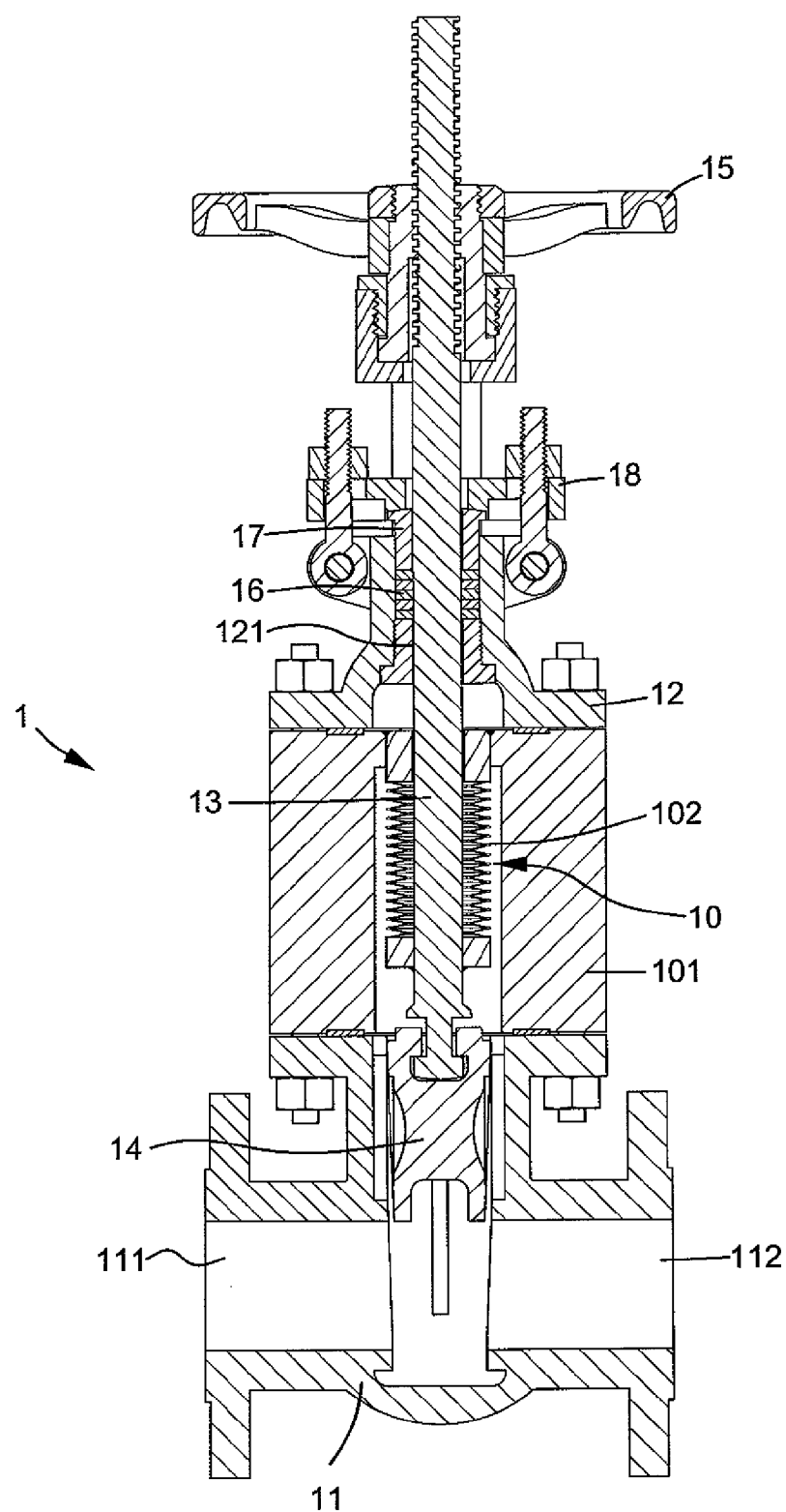
FIG. 1 shows a cross sectional view of a conventional valve.
Figure 2:
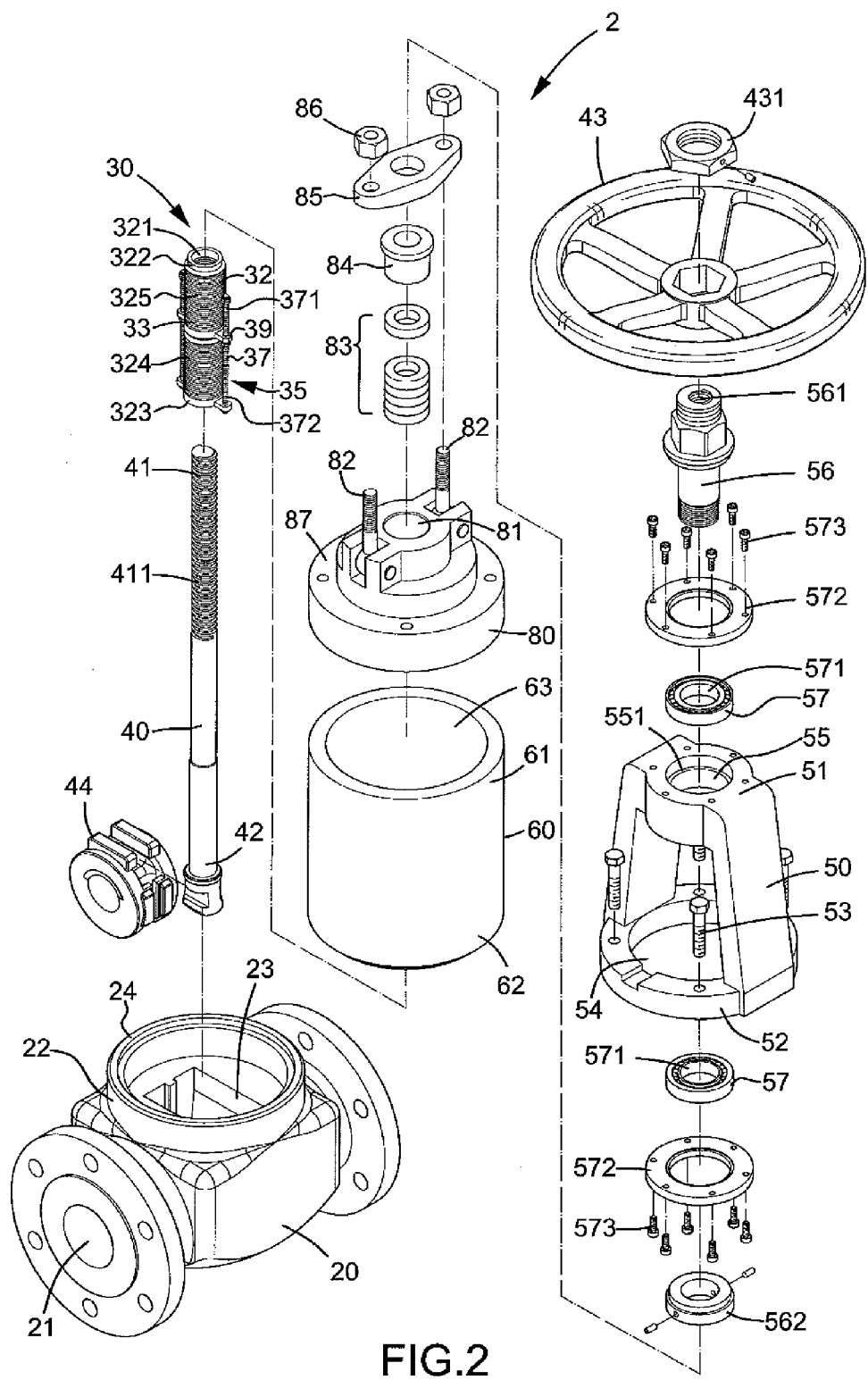
FIG. 2 shows an exploded, perspective view of a portion of a valve according to the present invention.

With reference to FIGS. 2-5, a valve 2 according to the present invention includes a body 20, a leakage prevention device 30, a valve rod 40, a hood 60, and a cap 80. The body 20 includes a fluid passage 21 (FIG. 11) having an inlet and an outlet for connection with pipes. A chamber 23 is formed in a top portion 22 of the body 20 and in communication with the fluid passage 21. A connecting portion 24 is provided on the top portion 22 of the body 20. The hood 60 includes top and bottom ends 61 and 62 spaced from each other in a longitudinal direction and a longitudinal hole 63 extending from the top end 61 through the bottom end 62. The bottom end 62 of the hood 60 is fixed to the connecting portion 24.

The valve rod 40 includes upper and lower ends 41 and 42 spaced from each other in the longitudinal direction. The upper end 41 of the valve rod 40 has a threaded portion 411. A hand wheel 43 is mounted to the upper end 41 of the valve rod 40. A plug 44 is mounted to the lower end 42 of the valve rod 40. The valve rod 40 extends through the chamber 23 of the body 20 and the longitudinal hole 63 of the hood 60. The plug 44 can move together with the valve rod 40 in the longitudinal direction to open or close the fluid passage 21 when the handle wheel 43 is rotated.

The cap 80 seals the upper end 61 of the hood 60 and the chamber 23 and includes an axial hole 81 through which the valve rod 40 extends. Two screw rods 82 are pivotably mounted to the cap 80 and can be pivoted to an upright position parallel to the longitudinal direction. The cap 80 can be fixed to the top end 61 of the hood 60 by welding. The axial hole 81 of the cap 80 is aligned with and coaxial to the longitudinal hole 63 of the hood 60. A plurality of fillers 83 is stacked in the axial hole 81 of the cap 80 and is extended through by the valve rod 40. A bushing 84 is mounted in the axial hole 81 of the cap 80 and located on top of the fillers 83. A pressing block 82 is mounted on top of the bushing 84. Each screw rod 82 in the upright position is extended through the pressing block 82 and fastened by a nut 86. An intermediate portion of the valve rod 40 extends through the axial hole 8I, the fillers 83, and the bushing 84. When the nuts 86 are rotated to press against the fillers 83 via the pressing block 85 and the bushing 80, the fillers 83 seal a gap between the valve rod 40 and an inner periphery of the axial hole 81 of the cap 80.

A top cover 50 is detachably mounted to a top end 87 of the cap 80 and includes top and bottom portions 51 and 52 spaced from each other in the longitudinal direction. The bottom portion 52 of the top cover 50 is fixed by screws 53 to the top end 87 of the cap 80. The bottom portion 52 of the top cover 50 includes a mounting hole 54 having a diameter larger than an outer diameter of the pressing block 85. Thus, the bottom portion 52 of the top cover 50 can pass through the pressing block 85 and fixed to the top end 87 of the cap 80. The upper end 41 of the valve rod 40 extends through the top cover 50. The top portion 51 of the top cover 50 is located adjacent to the hand wheel 50. A compartment 55 is formed in the top portion 51 of the top cover 50 and receives a sleeve 56 having a screw hole 561. The threaded portion 411 of the upper end 41 of the valve rod 40 is threadedly engaged with the screw hole 561 of the sleeve 56. An upper end of the sleeve 56 extends beyond the top cover 50 and the hand wheel 43. A retaining ring 431 is mounted around the upper end of the sleeve 56 to retain the sleeve 56. When the hand wheel 43 rotates, the sleeve 56 rotates freely in the compartment 55 of the top cover 50, and the valve rod 40 and the plug 44 move upward or downward to open or close the fluid passage 21 in the body 20.

At least one bearing 57 is mounted in the compartment 55 of the top cover 50. In the embodiment shown in FIGS. 2 and 3, two bearings 57 are mounted in the compartment 55 of the top cover 50 and spaced from each other in the longitudinal direction. The compartment 55 includes two enlarged annular sections 551 spaced from each other in the longitudinal direction. Each bearing 57 is mounted in one of the enlarged annular sections 551. A lower section of the sleeve 56 is extended through a central hole 571 of each bearing 57 and supported by the bearings 57. A fixing ring 572 is mounted to each of upper and lower sides of the top portion 51 of the top cover 50. Screws 573 are extended through each fixing ring 572 into the top portion 51 of the top cover 50. Thus, the bearings 57 are positioned in the compartment 55 of the top cover 50. Furthermore, a positioning ring 562 is threadedly engaged with a lower end of the sleeve 56 and abuts a bottom face of a lower one of the bearings 57, preventing the sleeve 56 from disengaging from the top cover 50.

The leakage prevention device 30 includes a stretchable jacket 32 and at least one limiting unit 35. The stretchable jacket 32 is resistant to corrosion and pressure. The stretchable jacket 32 can be of any desired form as conventional including but not limited to of a commercially available type, such as a metal bellows. The stretchable jacket 32 includes first and second ends 322 and 323 spaced from each other in the stretching direction parallel to the longitudinal direction and a through-hole 321 extending from the first end 322 through the second end 323. The valve rod 40 extends through the through-hole 321. A deformation section 33 is formed between the first and second ends 322 and 323. The first end 322 of the stretchable jacket 32 is sealingly coupled to a lower end of the axial hole 81 of the cap 80. The second end 323 of the stretchable jacket 32 is mounted around and seals an outer periphery of the lower end of the valve rod 40. Thus, the gap between the valve rod 40 and the inner periphery of the axial hole 81 of the cap 80 is sealed. The stretchable jacket 32 can be stretched when the valve rod 40 is moved downward and can be compressed when the valve rod 40 is moved upward.

In the form shown, the leakage prevention device 30 includes two limiting units 35 mounted on opposite sides of the stretchable jacket 32 and spaced from each other in a diametrical direction perpendicular to the longitudinal direction. Each limiting unit 35 includes a pull rod 37 and a stop 39. The stop 39 of each limiting unit 35 is formed on an outer periphery of the deformation section 33 and divides the stretchable jacket 32 into a first stretchable section 324 below the stop 39 and a second stretchable section 325 above the stop 39. Each stop 39 includes an upper face 391 and a lower face 392 spaced from the upper face 391 in the stretching direction. Each stop 39 further includes a through-hole 393 extending from the upper face 391 through the lower face 392. The pull rod 37 of each limiting unit 35 includes a first end 371 and a second end 372 spaced from the first end 371 along a longitudinal axis thereof parallel to the stretching direction. The pull rods 37 are located on opposite sides of the stretchable jacket 32 and spaced from each other in a diametrical direction perpendicular to the longitudinal direction. The second end 372 of the pull rod 37 of each limiting unit 35 is coupled to a location adjacent to the first end 322 or the second end 323 of the stretchable jacket 32. In the form shown in FIGS. 2-10, the second end 372 of the pull rod 37 of each limiting unit 35 is coupled to a location adjacent to the second end 323 of the stretchable jacket 32. Namely, each pull rod 37 is in a fixed relation to the valve rod 40. The pull rod 37 of each limiting unit 35 slideably extends through the through-hole 393 of one of the stops 39 and is movable relative to the stop 39 in the longitudinal direction. A first positioning member 36 and a second positioning member 38 are respectively mounted on the first end 371 and an intermediate portion of the pull rod 37 of each limiting unit 35 and spaced from each other in the longitudinal direction, and the stop 39 is located between the first and second positioning members 36 and 38. The first and second positioning members 36 and 38 limit the travel of the pull rods 37 in the longitudinal direction. Namely, the travel of the pull rods 37 relative to the stops 39 in the longitudinal direction is limited.

The stretchable jacket 32 of the leakage prevention device 30 effectively avoids the fluid conveyed by the valve 2 from leaking through the gap between the valve rod 40 and the inner periphery of the axial hole 81 of the cap 80. By providing the limiting units 35, the stretching/restoration extent of the stretchable jacket 32 can be shared by the first stretchable section 324 and the second stretchable section 325. Specifically, when the stretchable jacket 32 is stretched by downward movement of the valve rod 40 for closing the fluid passage 21, the first stretchable section 324 is stretched first (while the pull rods 37 move through the through-holes 393 in the stops 39) until the first positioning members 36 on the pull rods 37 come in contact with the upper end faces 391 of the stops 39, avoiding further stretching of the first stretchable section 324. The second stretchable section 325 is stretched by continuing downward movement of the valve rod 40. Thus, the first stretchable section 324 will not be stretched beyond its stretching capacity. As a result, the first and second stretchable sections 324 and 325 can evenly share the stretched extent of the stretchable jacket 32. It can be appreciated that the stops 39 are preferably at a middle portion of the deformation section 33 of the stretchable jacket 32 such that the first and second stretchable sections 324 and 325 can have the same stretching/restoring features. Furthermore, the deformation of the stretchable jacket 32 caused by the movement of the valve rod 40 for opening/closing the fluid passage 21 of the body 20 in the longitudinal direction is in the safe range to avoid permanent deformation or damage to the stretchable jacket 32. When the stretchable jacket 32 restores its initial shape during upward movement of the valve rod 40 for opening the fluid passage 21, the first stretchable section 324 restores its shape first while the pull rods 37 move through the through-holes 393 of the stops 39. When the second positioning members 38 on the pull rods 37 come in contact with the lower end faces 392 of the stops 39, the second stretchable section 325 starts to restore its shape, and restoration of the first stretchable section 324 is stopped, avoiding undesired compression and breakage of the first stretchable section 324. When the plug 44 is in the closed position, a spacing L between the first positioning member 36 on each pull rod 37 and the corresponding stop 39 in the longitudinal direction is smaller than or equal to the maximum deformation of the first or second stretchable section 324 or 325 in the longitudinal direction.

Figure 4:
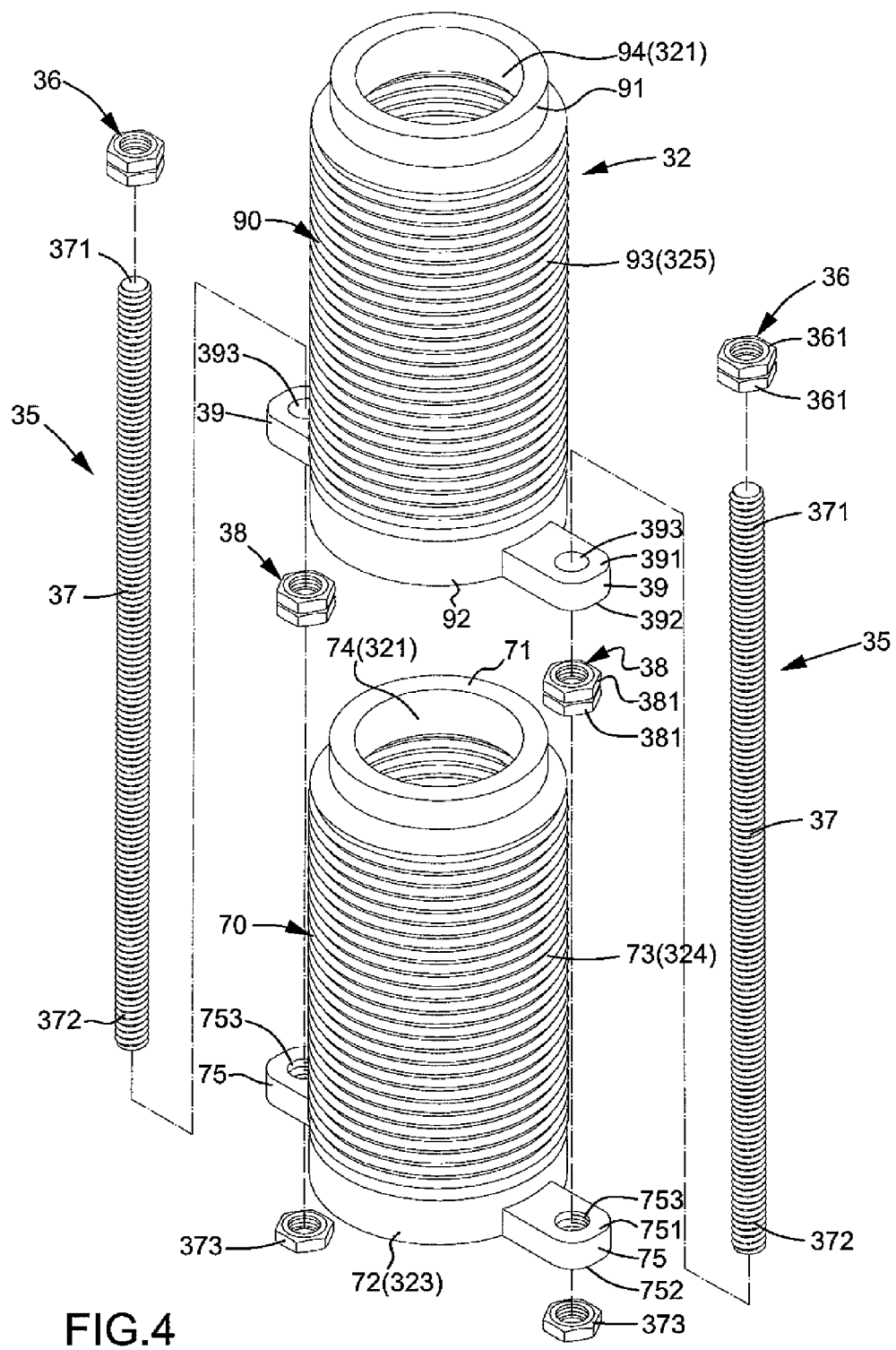
FIG. 4 is an exploded, perspective view of a leakage prevention device according to the present invention.
Figure 5:
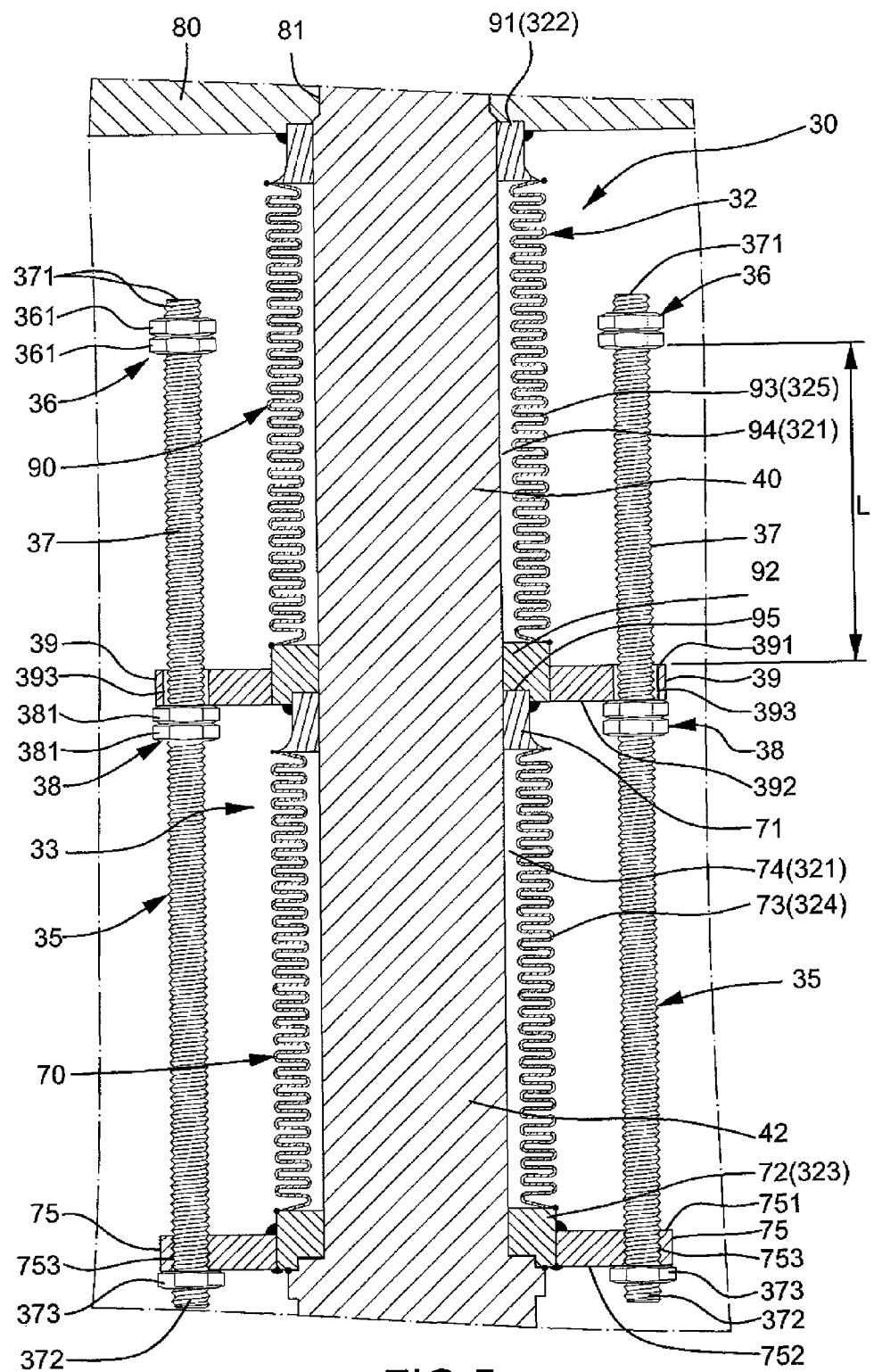
FIG. 5 is a cross sectional view of a portion A of the valve in FIG. 3.
Figure 6:
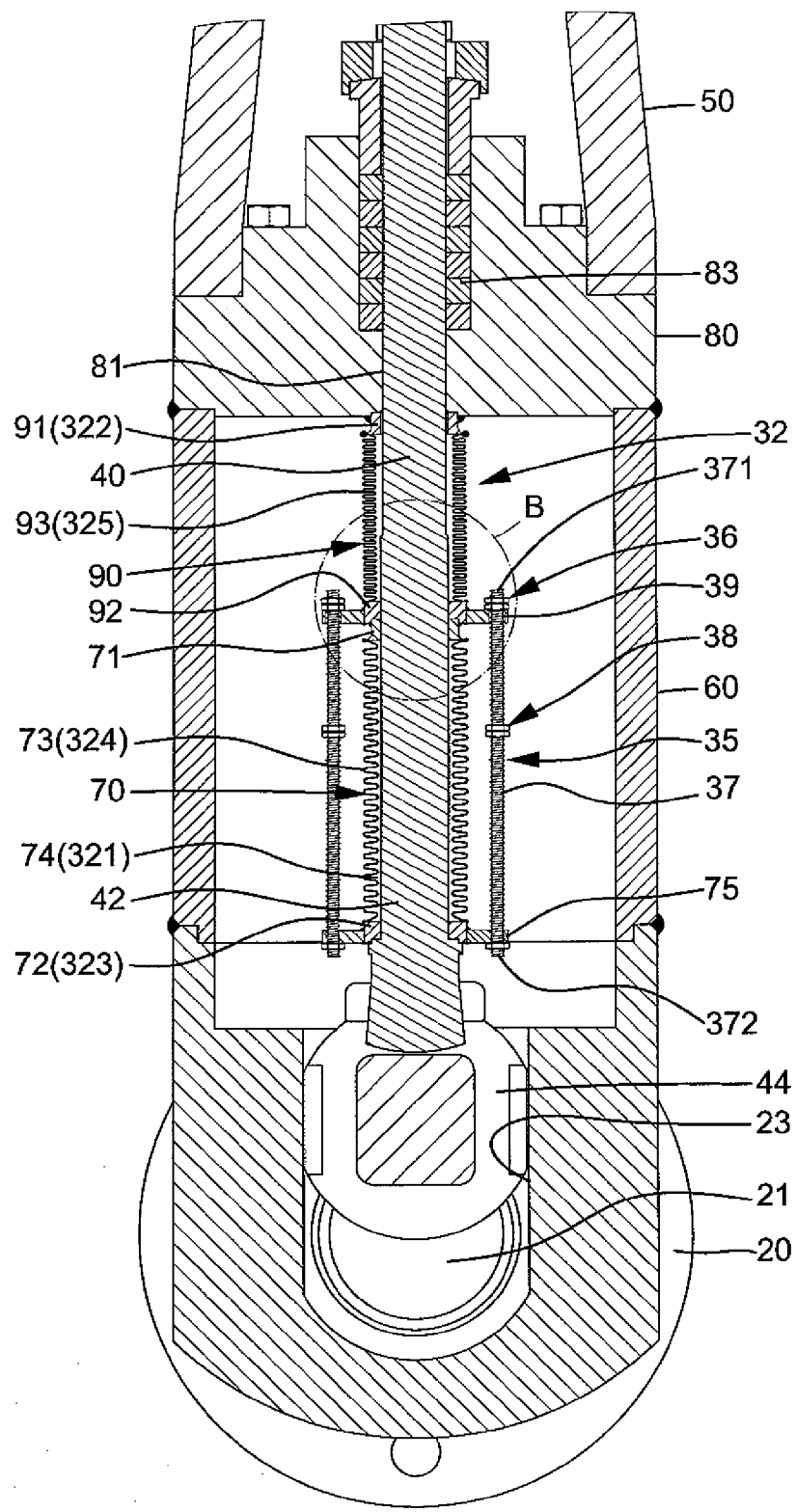
FIG. 6 is a view similar to FIG. 3, with a plug moved downward, and with a first stretchable tube stretched.

In an embodiment, the stretchable jacket 32 includes a first stretchable tube 70 and a second stretchable tube 90. With reference to FIGS. 4 and 5, the first stretchable tube 70 includes upper and lower collars 71 and 72 spaced from each other in the longitudinal direction and a stretchable section 73 between the upper and lower collars 71 and 72. The lower collar 72 has a lower end forming the second end 323 of the stretchable jacket 32. The stretchable section 73 forms the first stretchable section 324. The lower collar 72 is fixed to the outer periphery of the lower end 42 of the valve rod 40. The first stretchable tube 70 includes an axial hole 74 forming a portion of the axial hole 321 of the stretchable jacket 32. Two push portions 75 in the form of lugs are provided on an outer periphery of the lower collar 72 and spaced from each other in a diametrical direction perpendicular to the longitudinal direction. Each push portion 75 includes upper and lower faces 751 and 752 spaced from each other in the longitudinal direction and a screw hole 753 extending from the upper face 751 through the lower face 752. Each pull rod 37 can be in the form of a screw rod. The second end 372 of each pull rod 37 is threadedly engaged with the screw hole 753 of a corresponding push portion 75, and a fastener 373 is mounted to the second end 372 of each pull rod 37 and abuts the lower face 752 of the corresponding push portion 75, positioning the pull rod 37 on the push portion 75.

The second stretchable tube 90 includes upper and lower collars 91 and 92 spaced from each other in the longitudinal direction and a stretchable section 93 between the upper and lower collars 91 and 92. The upper collar 91 forms the first end 322 of the stretchable jacket 32. The stretchable section 93 forms the second stretchable section 325. The second stretchable tube 90 includes an axial hole 94 forming a portion of the axial hole 321 of the stretchable jacket 32 and aligned with the axial hole 74 of the first stretchable tube 70. A positioning groove 95 is defined in a bottom face of the lower collar 92 and coaxial to the axial hole 94. The upper collar 71 of the first stretchable tube 70 is fixed in the positioning groove 95. The stops 39 are formed on an outer periphery of the lower collar 92. Each first positioning member 36 includes two nuts 361. Each second positioning member 38 includes two nuts 381. However, a single nut 361, 381 can be used. Each first positioning member 36 is retained on the first end 371 of a corresponding pull rod 37. Each second positioning member 38 is retained on the intermediate portion of a corresponding pull rod 37.

The upper collar 71 of the first stretchable tube 70 is fixed in the positioning groove 95 of the lower collar 92 of the second stretchable tube 90 by welding. An upper end of the upper collar 91 of the second stretchable tube 90 is sealingly coupled to the lower end of the axial hole 81 of the cap 80 by welding. The axial hole 94 of the second stretchable tube 90 is aligned with the axial hole 81 of the cap 80. Each of the stretchable sections 73 and 93 of the first and second stretchable tubes 70 and 90 are integrally made of metal and includes a plurality of coils. An upper end of the stretchable section 93 is welded to a lower end of the upper collar 91, and a lower end of the stretchable section 93 is welded to an upper end of the lower collar 92. An upper end of the stretchable section 73 is welded to a lower end of the upper collar 71, and a lower end of the stretchable section 73 is welded to an upper end of the lower collar 72.

With reference to FIGS. 2-5, the valve rod 40 extends through the axial hole 74 of the first stretchable tube 70, the axial hole 94 of the second stretchable tube 90, and the axial hole 81 of the cap 80. The lower end 42 of the valve rod 40 is fixed to the lower collar 72 of the first stretchable tube 70. The plug 44 moves between an open position (FIG. 3) and a closed position (FIG. 8) when the valve rod 40 moves in the longitudinal direction.

Figure 3:
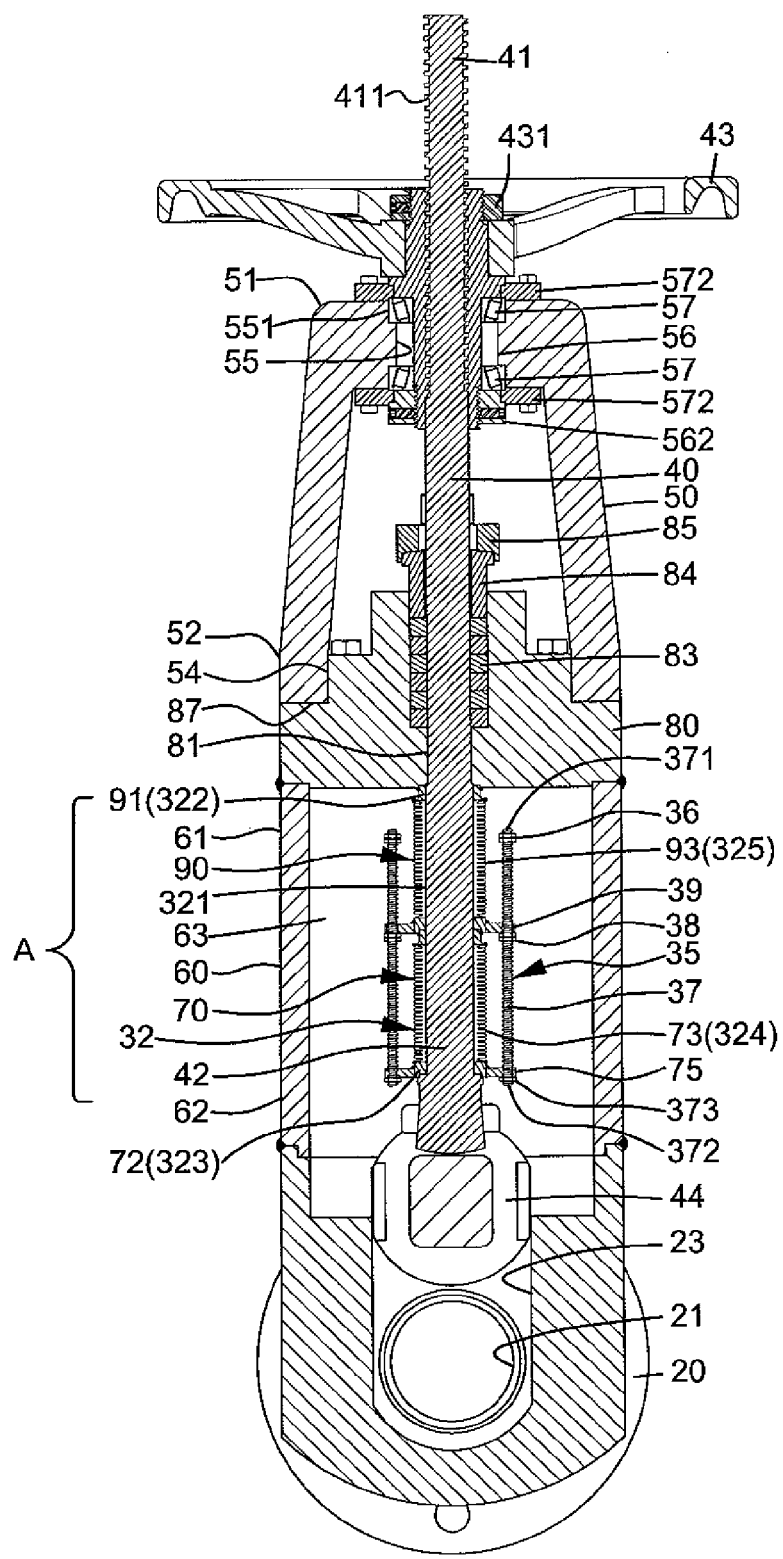
FIG. 3 is a cross sectional view of the valve according to the present invention.

Now that the basic construction of the stretchable jacket 32 has been explained, the operation and some of the advantages of the stretchable jacket 32 can be set forth and appreciated. In particular, for the sake of explanation, it will be assumed that the plug 44 is in the open position (FIG. 3). The first and second stretchable tubes 70 and 90 are not stretched in the longitudinal direction. The spacing L between the first positioning member 36 on each pull rod 37 and the upper face 391 of the corresponding stop 39 in the longitudinal direction is smaller or equal to the maximum stretching deformation of the first stretchable tube 70 in the longitudinal direction.

Figure 7:
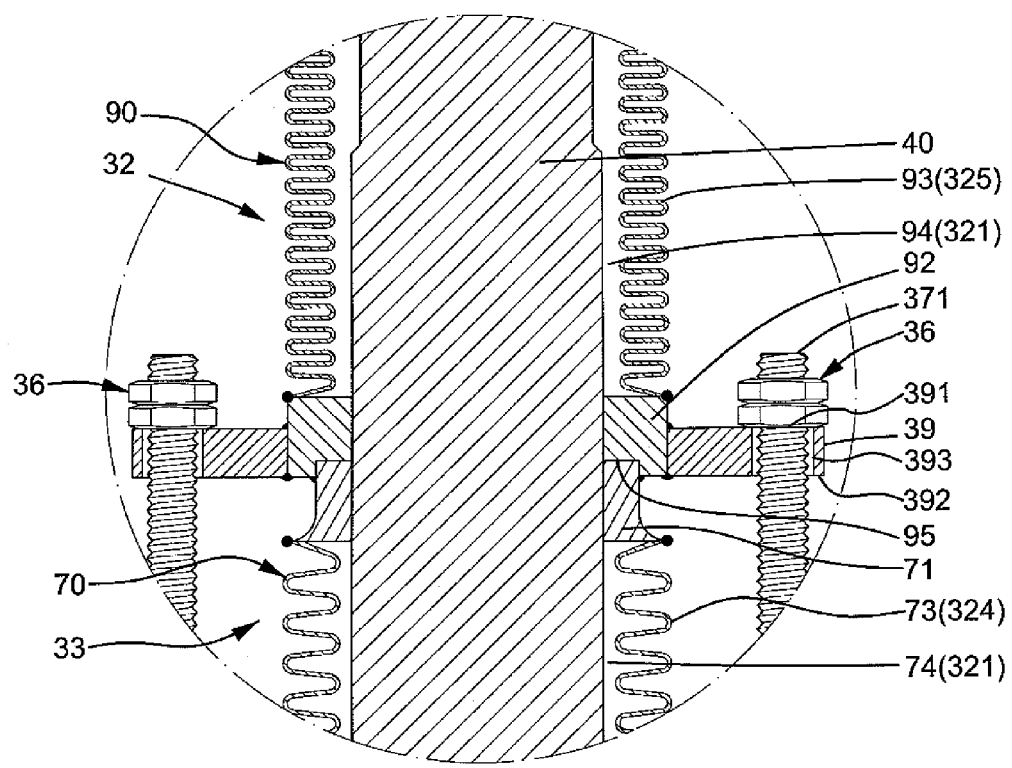
FIG. 7 is an enlarged view of a circled portion B in FIG. 6.
Figure 8:
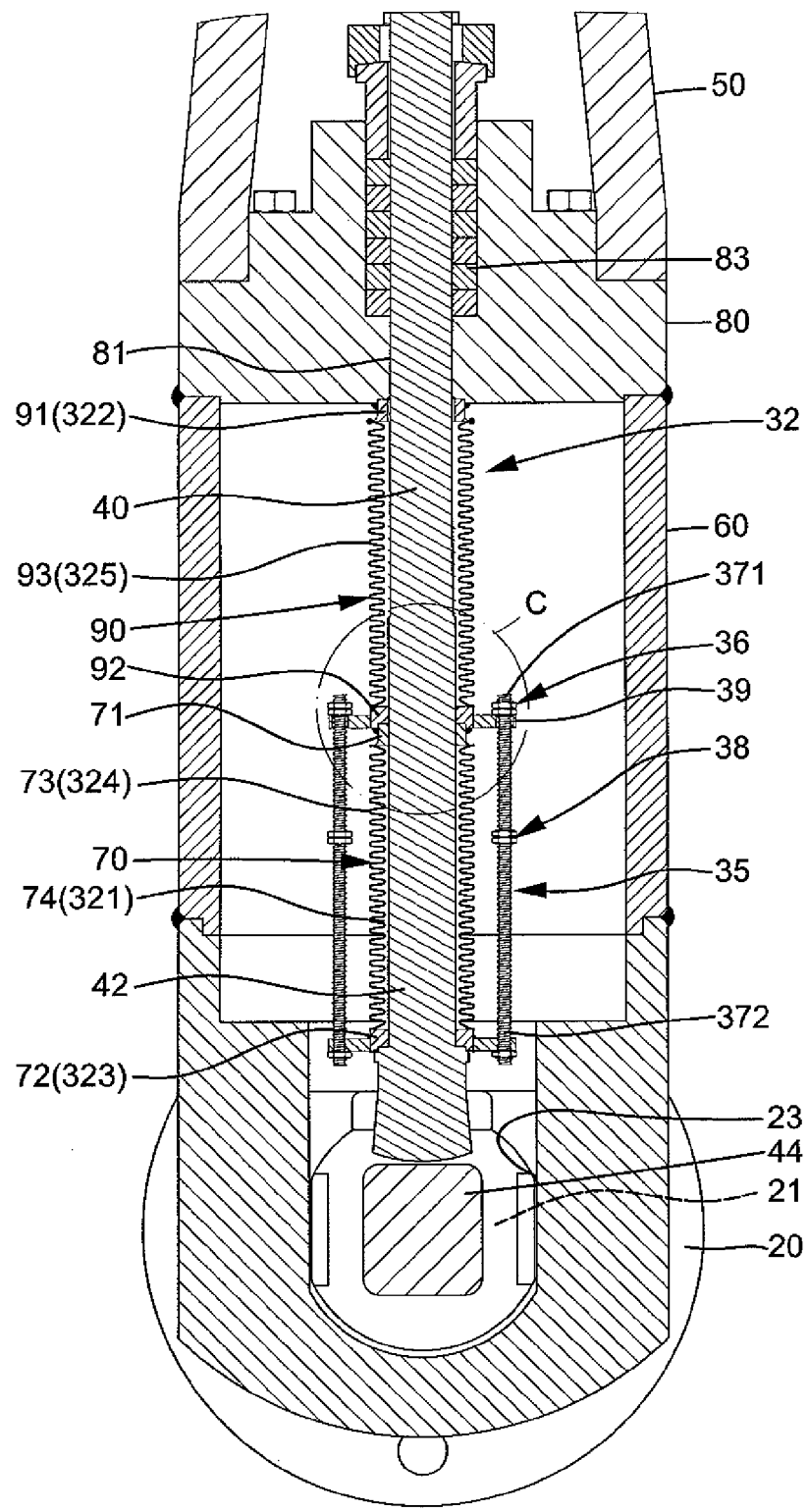
FIG. 8 is a view similar to FIG. 6, with the plug moved downward to a closed position, and with a second stretchable tube stretched.
Figure 9:
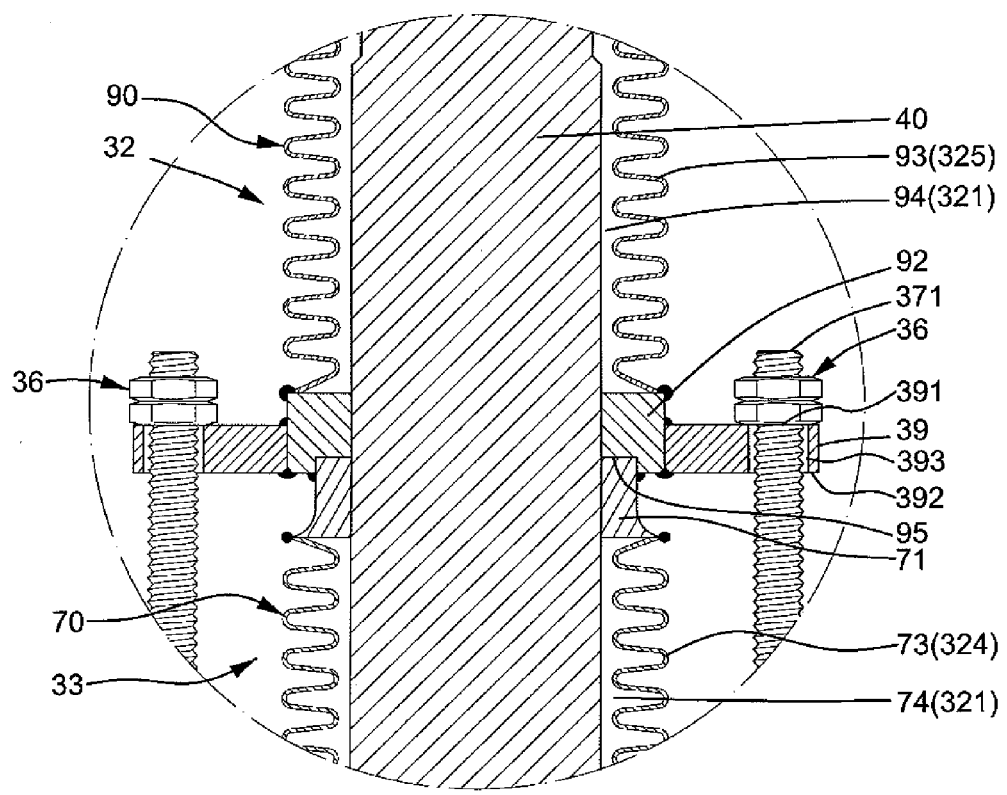
FIG. 9 is an enlarged view of a circled portion C in FIG. 8.

When the handle wheel 43 is rotated to move the valve rod 40 downward in the longitudinal direction and move the plug 44 to the closed position, the valve rod 40 carries the first stretchable tube 70 downward and stretches the first stretchable tube 70 (FIG. 6) until the first positioning member 36 on the first end 371 of each pull rod 37 comes in contact with the upper face 391 of the corresponding stop 39 on the second stretchable tube 90 (FIG. 7). Note that the second stretchable tube 90 could also be stretched before the first positioning members 36 come in contact with the stops 39. After the first positioning members 36 come in contact with the stops 39, continuing downward movement of the valve rod 40 only stretches the second stretchable tube 90 downward until the plug 44 reaches the closed position (FIGS. 8 and 9). Thus, opening operation of the valve 2 is smooth by the elastic deformation of the stretchable sections 73 and 93 of the first and second stretchable tubes 70 and 90.

Figure 10:
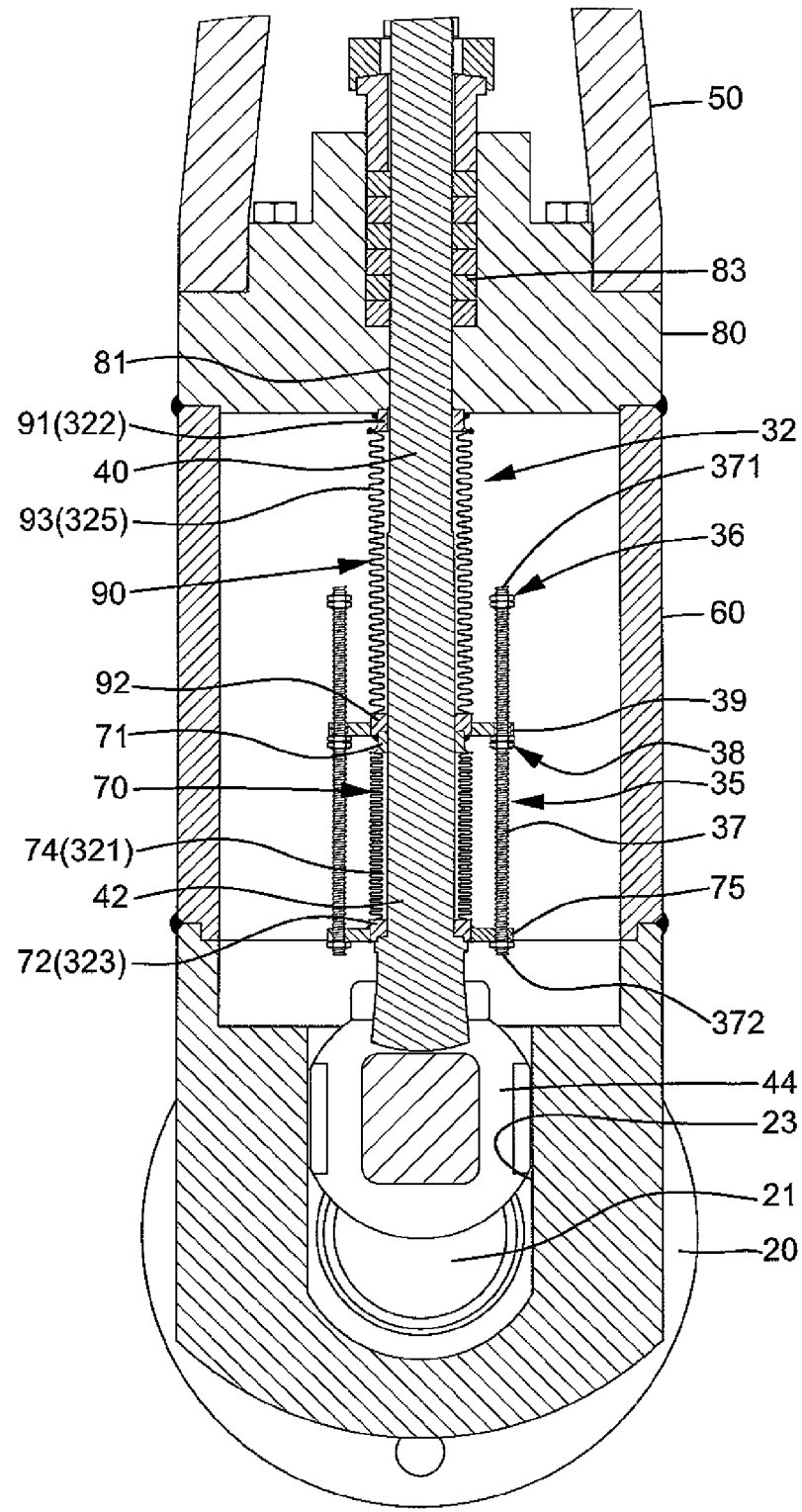
FIG. 10 is a view similar to FIG. 8, with the plug moved upward, and with the first stretchable tube restoring its shape.

On the other hand, when the hand wheel 43 is rotated to move the valve rod 40 upward in the longitudinal direction and move the plug 44 from the closed position to the open position, the valve rod 40 carries the first stretchable tube 70 upward and compresses the stretched first stretchable tube 70 until the second positioning member 38 on the intermediate portion of each pull rod 37 comes in contact with the lower face 392 of the corresponding stop 39 on the second stretchable tube 90 (FIG. 10). The second stretchable tube 90 could also be compressed before the second positioning members 38 come in contact with the stops 39. Thus, the second stretchable tube 90 can be moved upward and restores its shape until the plug 44 reaches the open position.

Due to the limiting functions of the first and second positioning members 36 and 38, over stretching and undesired compression of the stretchable sections 73 and 93 can be avoided. Furthermore, since the second stretchable tube 90 is stretched or restored after the first stretchable tube 70 is fully stretched or restored, concentration of deformation on the lower portion of either of the first and second stretchable tubes 70 and 90 can be avoided while assuring that the stretching deformation and/or the compression deformation of the first and second stretchable tubes 70 and 90 will not exceed the maximum deformation capacity thereof, avoiding permanent deformation and breakage of the first and second stretchable tubes 70 and 90. Thus, the leakage prevention device 30 provides excellent leakage prevention effect and has a prolonged life while providing smooth, elastic deformation.

Figure 11:
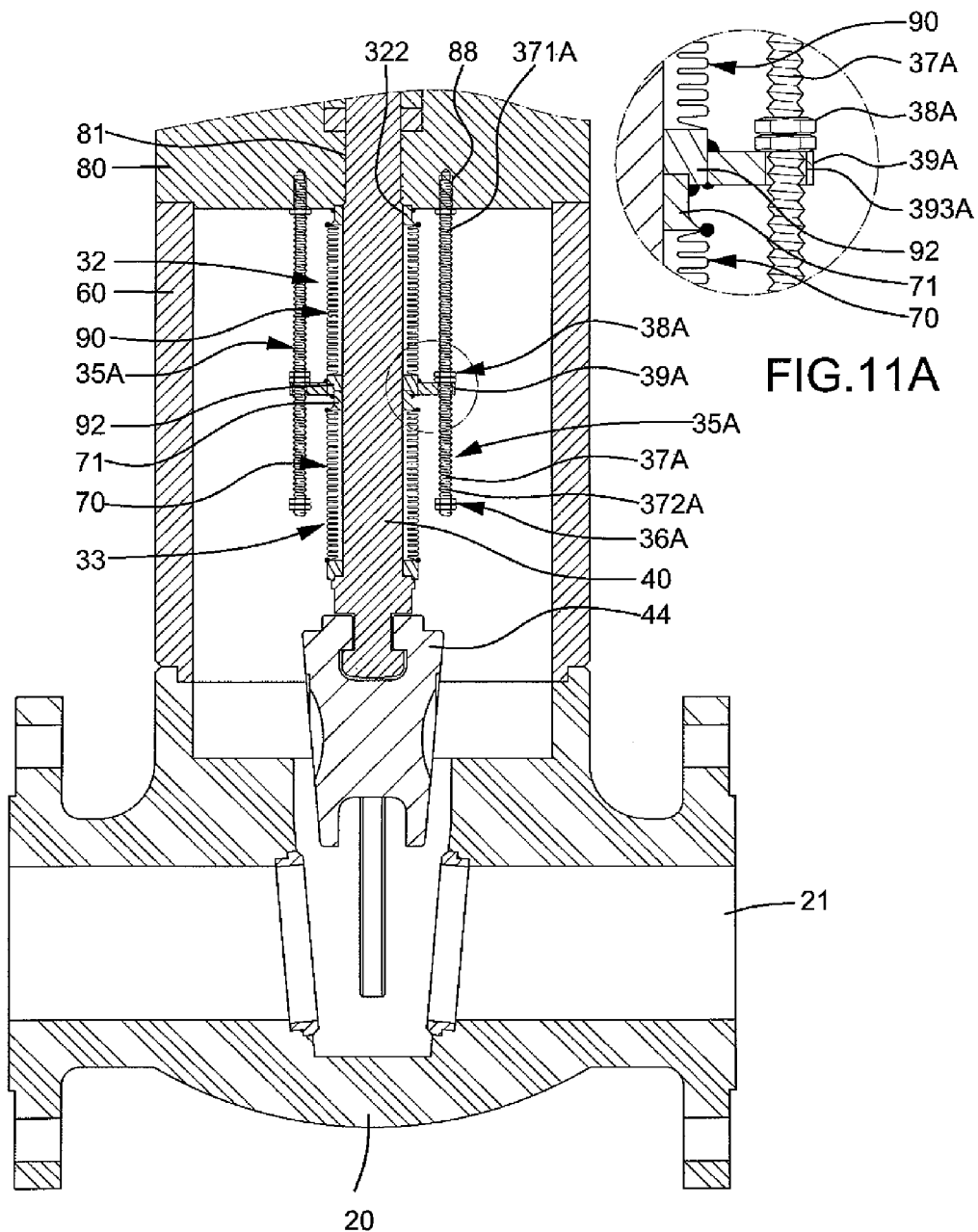
FIG. 11 shows a partial, cross sectional view of a valve of a second embodiment according to the present invention.

FIGS. 11 and 11A show another embodiment of the leakage prevention device 30. Specifically, the leakage prevention device 30 includes two limiting units 35A mounted on opposite sides of the stretchable jacket 32 and spaced from each other in a diametrical direction perpendicular to the longitudinal direction. Each limiting unit 35A includes a pull rod 37A and a stop 39A. The pull rod 37A of each limiting unit 35A includes a first end 371A and a second end 372A spaced from the first end 371A along a longitudinal axis thereof parallel to the stretching direction. The pull rods 37A are located on opposite sides of the stretchable jacket 32. Each pull rod 37A is in a fixed relation to the cap 80. Two screw holes 88 are formed in the bottom side of the cap 80. The first end 371A of each pull rod 73A is mounted in one of the screw holes 88. First and second positioning members 36A and 38A are respectively mounted on the second end 372A and an intermediate portion of each pull rod 37A. The stops 39A are mounted on the deformation section 33 of the stretchable jacket 32 and located between the first and second positioning members 36A and 38A. Each stop 39A has a through-hole 393A extending from an upper face thereof through a lower face thereof and slideably receiving one of the pull rods 37A. When the plug 44 is in the open position, a spacing between the first positioning member 36A and the stop 39 in the longitudinal direction is smaller or equal to a maximum deformation of the first stretchable section 324 or the second stretchable section 325 in the longitudinal direction.

When the handle wheel 43 is rotated to move the valve rod 40 downward in the longitudinal direction and move the plug 44 to the closed position, the valve rod 40 carries the second stretchable tube 90 downward and stretches the second stretchable tube 90 until the stops 39A come in contact with the second positioning members 38A on the pull rods 37A, limiting the deformation of the first stretchable tube 90 (the second stretchable section 325). Continuing downward movement of the valve rod 40 stretches the first stretchable tube 70 downward until the plug 44 reaches the closed position. Thus, opening operation of the valve 2 is smooth by the elastic deformation of the stretchable sections 73 and 93 of the first and second stretchable tubes 70 and 90.

When the valve rod 40 moves upward to move the plug 44 from the closed position to the open position, restoration of the stretchable section between the first end 322 of the stretchable jacket 32 and the stops 39A (the second stretchable section 325) is stopped when the second stops 39A come in contact with the first positioning members 36A on the pull rods 37A.

The stretchable jacket 32 includes two stretchable sections and, thus, has uniform stretching and uniform restoration. Furthermore, limiting units 35 avoid undesired stretching and restoration of each stretchable section of the stretchable jacket 32, prolonging the service life of the stretchable jacket 32. It can be appreciated that the limiting units 35 can be mounted on the first or second stretchable section 324, 325 or an intersection of the first and second stretchable sections 324 and 325.

The limiting units 35A can be used with the limiting units 35 in the form shown in FIGS. 1-10, with each limiting unit 35A located between the limiting units 35 in a circumferential direction, and with the limiting units 35 and 35A spaced from each other by 90° in the circumferential direction. The deformation capacity of the stretchable unit 32 can be significantly increased.

Now that the basic teachings have been explained, many extensions and variations will be obvious to one having ordinary skill in the art. For example, the pull rods 37, 37A do not have to include threads, and the first and second positioning members 36, 36A, 38, 38A and the fasteners 373 can be annular rings or retaining rings fixed to the pull rods 37. Furthermore, the second end 372 of each pull rod 37 can be welded to the corresponding push portion 75 of the first stretchable tube 70. In another example, the second end 372 of each pull rod 37 can be directly fixed to the lower collar 92 of the second stretchable tube 90. Further, the stops 39 can be provided on the upper collar 71 of the first stretchable tube 70 and extended by the corresponding pull rod 37. Furthermore, if the costs of casting or forging are not the issue, the hood 60 can be integrally formed with the body 20 or the cap 80. Further, the leakage prevention device 30 can include only one limiting unit 35, 35A.

Although specific embodiments have been illustrated and described, numerous modifications and variations are still possible without departing from the scope of the invention. The scope of the invention is limited by the accompanying claims.

The invention claimed is:

1. A valve comprising:
a body (20) including a fluid passage (21), with the body (21) further including a top portion (22) having a chamber (23) in communication with the fluid passage (21);
a cap (80) mounted to the top portion (22) of the body (20) and sealing the chamber (23), with the cap (80) including an axial hole (81) aligned with the chamber (23) in a longitudinal direction;
a valve rod (40) including upper and lower ends (41, 42) spaced from each other in the longitudinal direction, with the valve rod (40) received in the chamber (23) of the body (20) and the axial hole (81) of the cap (80), with a hand wheel (43) mounted to the upper end (41) of the valve rod (40), with a plug (44) mounted to the lower end (42) of the valve rod (40), with the hand wheel (43) rotatable to move the valve rod (40) and the plug (43) in the longitudinal direction between an open position and a closed position to open or close the fluid passage of the body (20);
a stretchable jacket (32) stretchable in a stretching direction parallel to the longitudinal direction, with the stretchable jacket (32) including first and second ends (322, 323) spaced from each other in the stretching direction and a deformation section (33) between the first and second ends (322, 323) of the stretchable jacket (32), with the stretchable jacket (32) further including a through-hole (321) receiving the valve rod (40), with the first end (322) of the stretchable jacket (32) sealingly coupled a lower end of the through-hole (81) of the cap (80), with the second end (323) of the stretchable jacket (32) fixed to the valve rod (40); and
a first limiting unit (35) including a pull rod (37) and a stop (39), with the stop (39) located at the deformation section (33) of the stretchable jacket (32), dividing the stretchable jacket (32) into a first stretchable section (324) between the second end (323) of the stretchable jacket (32) and the stop (39) and a second stretchable section (325) between the stop (39) and the first end (322) of the stretchable jacket (32), with the stop (39) including a through-hole (393) extending in a direction parallel to the stretching direction, with the pull rod (37) including first and second ends (371, 372) spaced from each other in the longitudinal direction, with the second end (372) of the pull rod (37) fixed in relation to the valve rod (40), with the pull rod (37) slideably extending through the through-hole (393) of the stop (39), with a first positioning member (36) mounted on the first end (371) of the pull rod (37), with a second positioning member (38) mounted on the pull rod (37) and located between the stop (39) and the second end (372) of the pull rod (37), with the stop (39) located between the first and second positioning members (36, 38), with the first and second positioning members (36, 38) limiting travel of the pull rod (37) in the longitudinal direction,
wherein when the valve rod (40) moves in the longitudinal direction to move the plug (44) from the open position to the closed position, the stretchable jacket (32) is stretched, and stretching of the first stretchable section (324) in the longitudinal direction is stopped when the first positioning member (36) comes in contact with the stop (39), and
wherein when the valve rod (40) moves in the longitudinal direction to move the plug (44) from the closed position to the open position, the first stretchable section (324) restores its shape, and restoration of the first stretchable section (324) is stopped when the second positioning member (38) comes in contact with the stop (39).

2. The valve as claimed in claim 1, with the stretchable jacket (32) including first and second stretchable tubes (70, 90), with the first stretchable tube (70) including upper and lower collars (71, 72) spaced from each other in the longitudinal direction, with the lower collar (72) of the first stretchable tube (70) forming the second end (323) of the stretchable jacket (32), with a stretchable section (73) formed between the upper and lower collars (71, 72) of the first stretchable tube (70), with the lower collar (72) of the first stretchable tube (70) fixed to the lower end (42) of the valve rod (40) and including a push portion (75), with the second end (372) of the pull rod (37) mounted to the push portion (75), with the valve rod (40) and the pull rod (37) jointly movable in the longitudinal direction, with the second stretchable tube (90) including upper and lower collars (91, 92) spaced from each other in the longitudinal direction, with the upper collar (91) of the second stretchable tube (90) forming the first end (322) of the stretchable jacket (32), with a stretchable section (93) formed between the upper and lower collars (91, 92) of the second stretchable tube (90), with the stretchable sections (73, 93) forming the deformation section (33) of the stretchable jacket (32), with the lower collar (92) of the second stretchable tube (90) mounted to the upper collar (71) of the first stretchable tube (70), with the stop (39) formed on an outer periphery of the lower collar (92) of the second stretchable tube (90).

3. The valve as claimed in claim 2, with the lower collar (92) of the second stretchable tube (90) including a bottom side having a positioning groove (95), with the upper collar (71) of the first stretchable tube (70) fixed in the positioning groove (95).

4. The valve as claimed in claim 1, wherein with the plug (44) in the open position, a spacing (L) between the first positioning member (36) and the stop (39) in the longitudinal direction is smaller or equal to a maximum deformation of the first stretchable section (324) or the second stretchable section (325) in the longitudinal direction.

5. The valve as claimed in claim 1, further comprising: a second limiting unit (35) including a pull rod (37) and a stop (39), with the stop (39) of the second limiting unit (35) located on the deformation section (33) and spaced from the stop (39) of the first limiting unit (35) in a diametrical direction perpendicular to the longitudinal direction, with the stop (39) of the second limiting unit (35) including a through-hole (393) extending in a direction parallel to the stretching direction, with the pull rod (37) of the second limiting unit (35) including first and second ends (371, 372) spaced from each other in the longitudinal direction, with the second end (372) of the pull rod (37) of the second limiting unit (35) fixed in relation to the valve rod (40), with the pull rod (37) of the second limiting unit (35) slideably extending through the through-hole (393) of the stop (39) of the second limiting unit (35), with a third positioning member (36) mounted on the first end (371) of the pull rod (37) of the second limiting unit (35), with a fourth positioning member (38) mounted on the pull rod (37) of the second limiting unit (35) and located between the stop (39) and the second end (372) of the pull rod (37) of the second limiting unit (35), with the stop (39) of the second limiting unit (35) located between the third and fourth positioning members (36, 38), with the third and fourth positioning members (36, 38) limiting travel of the pull rod (37) of the second limiting unit (35) in the longitudinal direction.

6. The valve as claimed in claim 5, wherein with the plug (44) in the open position, a spacing (L) between the third positioning member (36) and the stop (39) of the second limiting unit (35) in the longitudinal direction is smaller or equal to a maximum deformation of the first stretchable section (324) or the second stretchable section (325) in the longitudinal direction.

7. The valve as claimed in claim 6, further comprising: two third limiting units (35A), with each of the two third limiting units (35A) located between the first and second limiting units (35), with each of the two third limiting units (35A) including a pull rod (37A) and a stop (39A), with the stop (39A) of each of the two third limiting units (35A) located at the deformation section (33), with the stop (39A) of each of the two third limiting units (35A) including a through-hole (393A) extending in a direction parallel to the stretching direction, with the pull rod (37A) of each of the two third limiting units (35A) including first and second ends (371A, 372A) spaced from each other in the longitudinal direction, with the first end (371A) of the pull rod (37A) of each of the two third limiting units (35A) fixed to the cap (80), with the pull rod (37A) of each of the two third limiting units (35A) slideably extending through the through-hole (393A) of the stop (39A) of one of the two third limiting units (35A), with the stop (39A) of each of the two third limiting units (35A) movable relative to the pull rod (37A) of one of the two third limiting units (35A) in the longitudinal direction, with a fifth positioning member (36A) mounted on the second end (372A) of the pull rod (37A) of each of the two third limiting units (35A), with a sixth positioning member (38A) mounted on the pull rod (37A) of each of the two third limiting units (35A), with the stop (39A) of each of the two third limiting units (35A) located between the fifth and sixth positioning members (36, 38), with the fifth and sixth positioning members (36A, 38A) limiting travel of the pull rod (37A) of each of the two third limiting units (35A) in the longitudinal direction.

8. A valve comprising:
a body (20) including a fluid passage (21), with the body (21) further including a top portion (22) having a chamber (23) in communication with the fluid passage (21);
a cap (80) mounted to the top portion (22) of the body (20) and sealing the chamber (23), with the cap (80) including an axial hole (81) aligned with the chamber (23) in a longitudinal direction;
a valve rod (40) including upper and lower ends (41, 42) spaced from each other in the longitudinal direction, with the valve rod (40) received in the chamber (23) of the body (20) and the axial hole (81) of the cap (80), with a hand wheel (43) mounted to the upper end (41) of the valve rod (40), with a plug (44) mounted to the lower end (42) of the valve rod (40), with the hand wheel (43) rotatable to move the valve rod (40) and the plug (43) in the longitudinal direction between an open position and a closed position to open or close the fluid passage of the body (20);
a stretchable jacket (32) stretchable in a stretching direction parallel to the longitudinal direction, with the stretchable jacket (32) including first and second ends (322, 323) spaced from each other in the stretching direction and a deformation section (33) between the first and second ends (322, 323) of the stretchable jacket (32), with the stretchable jacket (32) further including a through-hole (321) receiving the valve rod (40), with the first end (322) of the stretchable jacket (32) sealingly coupled a lower end of the through-hole (81) of the cap (80), with the second end (323) of the stretchable jacket (32) fixed to the valve rod (40); and
a limiting unit (35A) including a pull rod (37A) and a stop (39A), with the stop (39A) located at the deformation section (33) of the stretchable jacket (32), dividing the stretchable jacket (32) into a first stretchable section (324) between the second end (323) of the stretchable jacket (32) and the stop (39A) and a second stretchable section (325) between the stop (39A) and the first end (322) of the stretchable jacket (32), with the stop (39A) including a through-hole (393A) extending in a direction parallel to the stretching direction, with the pull rod (37A) including first and second ends (371A, 372A) spaced from each other in the longitudinal direction, with the first end (371A) of the pull rod (37A) fixed to the cap (80), with the pull rod (37A) slideably extending through the through-hole (393A) of the stop (39A), with the stop (39A) movable relative to the pull rod (37A) in the longitudinal direction, with a first positioning member (36A) mounted on the second end (372A) of the pull rod (37A), with a second positioning member (38A)

mounted on the pull rod (37A), with the stop (39A) located between the first and second positioning members (36, 38), with the first and second positioning members (36A, 38A) limiting travel of the pull rod (37A) in the longitudinal direction, wherein when the valve rod (40) moves in the longitudinal direction to move the plug (44) from the open position to the closed position, the stretchable jacket (32) is stretched, and stretching of the second stretchable section (325) in the longitudinal direction is stopped when the stop (39A) comes in contact with the first positioning member (36A), and wherein when the valve rod (40) moves in the longitudinal direction to move the plug (44) from the closed position to the open position, the second stretchable section (325) restores its shape, and restoration of the second stretchable section (325) is stopped when the stop (39A) comes in contact with the second positioning member (38A).

9. The valve as claimed in claim 8, with the stretchable jacket (32) including first and second stretchable tubes (70, 90), with the first stretchable tube (70) including upper and lower collars (71, 72) spaced from each other in the longitudinal direction, with the lower collar (72) of the first stretchable tube (70) forming the second end (323) of the stretchable jacket (32), with a stretchable section (73) formed between the upper and lower collars (71, 72) of the first stretchable tube (70), with the lower collar (72) of the first stretchable tube (70) fixed to the lower end (42) of the valve rod (40), with the second stretchable tube (90) including upper and lower collars (91, 92) spaced from each other in the longitudinal direction, with the upper collar (91) of the second stretchable tube (90) forming the first end (322) of the stretchable jacket (32), with a stretchable section (93) formed between the upper and lower collars (91, 92) of the second stretchable tube (90), with the stretchable sections (73, 93) forming the deformation section (33) of the stretchable jacket (32), with the lower collar (92) of the second stretchable tube (90) mounted to the upper collar (71) of the first stretchable tube (70), with the stop (39A) formed on an outer periphery of the lower collar (92) of the second stretchable tube (90).

10. The valve as claimed in claim 8, wherein with the plug (44) in the open position, a spacing between the first positioning member (36A) and the stop (39A) in the longitudinal direction is smaller or equal to a maximum deformation of the first stretchable section (324) or the second stretchable section (325) in the longitudinal direction.

* * * * *